(12) United States Patent
Dasappa et al.

(10) Patent No.: US 9,181,901 B2
(45) Date of Patent: Nov. 10, 2015

(54) PRODUCER GAS CARBURETTOR

(75) Inventors: Srinivasaiah Dasappa, Karnataka (IN); Palakat Joseph Paul, Karnataka (IN); Meena Paul, legal representative, Karnataka (IN); Sara Paul, legal representative, Karnataka (IN); Kiran Paul, legal representative, Karnataka (IN); Nagamangala Krishnaiyengar Srirangarajan, Karnataka (IN)

(73) Assignee: Indian Institute of Science, Bangalore (IN)

( * ) Notice: Subject to any disclaimer, the term of this patent is extended or adjusted under 35 U.S.C. 154(b) by 0 days.

(21) Appl. No.: 13/505,964

(22) PCT Filed: Nov. 1, 2010

(86) PCT No.: PCT/IN2010/000713
§ 371 (c)(1),
(2), (4) Date: Jul. 17, 2012

(87) PCT Pub. No.: WO2011/055382
PCT Pub. Date: May 12, 2011

(65) Prior Publication Data
US 2013/0014732 A1  Jan. 17, 2013

(30) Foreign Application Priority Data
Nov. 3, 2009  (IN) .......................... 2659/CHE/2009

(51) Int. Cl.
*F02M 21/04* (2006.01)
*F02M 13/08* (2006.01)

(52) U.S. Cl.
CPC ............... *F02M 21/04* (2013.01); *F02M 13/08* (2013.01); *Y02T 10/32* (2013.01)

(58) Field of Classification Search
CPC ........ F02B 1/04; F02B 37/16; F02D 41/0027; F02D 35/0053; F02D 41/0007; F02D 13/028; F02M 7/24; F02M 21/04; F02M 21/047; F02M 25/089; F02M 13/08; F02M 25/0711; F02M 17/08; F02M 21/02; F02M 17/04; F02M 19/08
USPC ........ 123/527, 529, 545, 543; 261/96, 99, 65, 261/95, 102
See application file for complete search history.

(56) References Cited

U.S. PATENT DOCUMENTS 2,559,605 A * 7/1951 Drouilly .................. 48/197 FM
4,164,914 A * 8/1979 Hattori .................. F02D 35/003
123/587

(Continued)

FOREIGN PATENT DOCUMENTS

CA  2 549 215 A1  12/2007
GB  1 327 513  8/1973

*Primary Examiner* — Lindsay Low
*Assistant Examiner* — Long T Tran
(74) *Attorney, Agent, or Firm* — Laurence P. Cotton; Smith Risley Tempel Santos LLC

(57) ABSTRACT

Disclosed herein is a class of gas carburettor (9) for low calorific value gas for A/F ratio control to be used engines operating on producer gas with a load following capabilities. The gas carburettor has A/F ratio from 1.2:1 for producer gas to about 5:1 for biogas. The gas carburettor of the present invention has right A/F control at varying load conditions due to its optimized dimensions at the throat (7) and area ration control flapper (6) along with the zero pressure regulators. Additionally, using a by-pass facility starting the engine is established. By the use of a zero pressure regulator on the gas line, the gas pressure in the air and gas lines are maintained nearly the same downstream of the carburettor which helps in managing the appropriate air-to-fuel ratio based on the gas and air passage areas.

17 Claims, 5 Drawing Sheets

(56) References Cited

U.S. PATENT DOCUMENTS

| | | | | |
|---|---|---|---|---|
| 4,174,690 A * | 11/1979 | Sumiyoshi | F02D 41/0027 | 123/698 |
| 4,300,490 A * | 11/1981 | Hattori | F02D 41/1482 | 123/439 |
| 4,422,423 A * | 12/1983 | Sugiyama | F02M 3/08 | 123/437 |
| 4,426,976 A * | 1/1984 | Tanahashi | F02M 3/09 | 123/699 |
| 4,593,663 A * | 6/1986 | Atago et al. | 123/339.12 | |
| 4,693,663 A * | 9/1987 | Brenholt | B25J 9/047 | 414/735 |
| 5,070,851 A * | 12/1991 | Janisch | F02M 13/08 | 123/527 |
| 5,345,918 A * | 9/1994 | Lambert | F02B 75/16 | 123/527 |
| 5,460,149 A * | 10/1995 | Tofel | F02M 7/11 | 123/676 |
| 6,932,052 B1 | 8/2005 | Fulton | | |
| 7,097,162 B2 * | 8/2006 | Ichihara | F02M 17/04 | 261/35 |
| 7,383,861 B1 | 6/2008 | Brown | | |
| 7,971,858 B2 * | 7/2011 | Takahashi | F02M 9/02 | 261/48 |
| 2004/0182330 A1 * | 9/2004 | Frutschi | F01K 21/047 | 123/25 A |
| 2009/0088950 A1 * | 4/2009 | Fisher | F02D 31/002 | 701/103 |

* cited by examiner

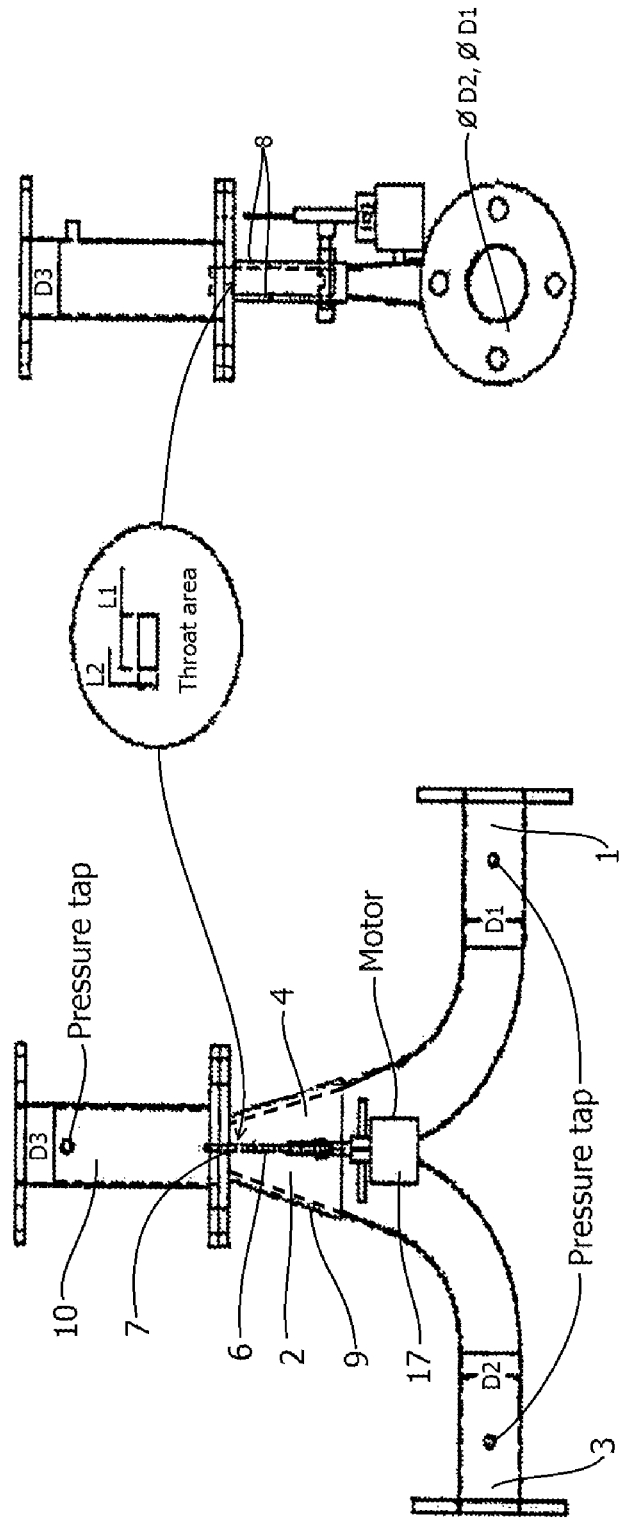
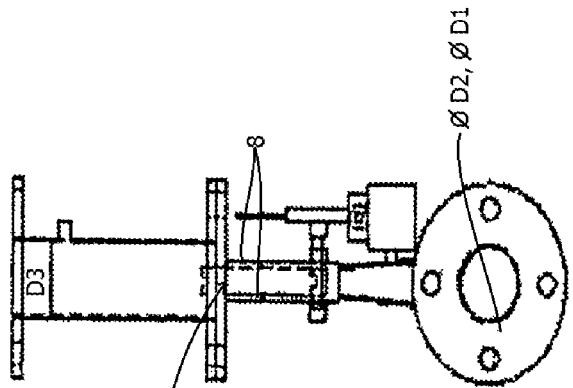
Figure 2
Figure 3

PRODUCER GAS CARBURETTOR

FIELD OF INVENTION

This invention relates to a gas carburettor designed for biomass derived producer gas fuel, so as to provide the right air-to-fuel mixture at varying loads and ensure complete combustion with very low emissions in a reciprocating engine and also burners for any heat applications.

BACKGROUND

Gaseous fuels are turning out to be a major fuel source for power generation via internal combustion engines, which includes reciprocating engines and gas turbine machinery. This is mainly because of the requirement for cleaner combustion and thereby lesser pollutants. The gaseous fuels include natural gas, liquefied petroleum gas, bio-gas, land fill gas and producer gas derived from biomass. The air-to-fuel ratio (A/F) and other properties of various gaseous fuels are summarized in the Table below:

TABLE 1

Energy density & air-to-fuel ratios (A/F) of various fuel gases

| Fuel Gas | LCV, MJ/kg | A/F (mole) | A/F (Mass) | Energy, MJ/kg | Energy, MJ/N$^3$ |
|---|---|---|---|---|---|
| Hydrogen | 121 | 2.4 | 34.4 | 3.42 | 3.19 |
| Natural gas (~100% Methane) | 50.2 | 9.5 | 17.2 | 2.76 | 3.40 |
| Bio gas, (~60% Methane, 40% CO$_2$) | 17.6 | 5.7 | 6.1 | 2.47 | 3.05 |
| Propane | 46.5 | 23.8 | 15.6 | 2.80 | 5.50 |
| Butane | 45.5 | 30.9 | 15.4 | 2.77 | 7.18 |
| Producer Gas | 5.0 | 1.1 | 1.35 | 2.13 | 2.56 |

LCV: Lower Calorific Value

It is evident from the Table 1 that the A/F required for natural gas is about 9.5:1 on volume basis. The same for bio-gas (60% methane and rest carbon dioxide) is about 6.1:1, similarly the A/F for landfill gas would fall in-between based on the methane content and other combustible constituents in the fuel gas. Whereas, the A/F required for producer gas containing about 18-20% $H_2$ & CO each, 2% $CH_4$, rest, inert is about 1.12:1. Since the A/F for producer gas is widely different compared to either natural gas or bio-gas, the commercially available gas carburettor meant for either natural gas/land fill gas/bio-gas is unsuitable for producer gas. The commercial gas carburettors for fossil fuel need fuel gas at high pressure (~$10^5$ Pa (1 bar)), as the fuel is available under pressure. These carburettors are designed for the fossil fuel is whose energy density is higher than the biogas or producer gas, having implications on the sizes and designed consideration. These carburettors will have small passages for the same energy input compared with low energy content gas.

Typically, for producer gas whose energy content is about $1/10^{th}$ that of any fossil fuel, requires 10 times the flow into the same fossil fuel carburettor, which is impossible due to issues related to pressure drops, etc a fluid dynamic issue. The producer gas generated in a gasifier is typically available at a pressure slightly above the ambient pressure (~3000-4000 Pa).

Therefore if an engine fitted with natural gas carburettor were to be used for producer gas operation then it will lead to operation that at not optimal with respect to the performance and the delivered power by the engine would be very low. This therefore calls for a different carburettor to suit A/F requirement for producer gas fuel.

There have been many designs of carburettors for various fuel gases meant to be used in gas engines.

DISCUSSION OF THE PRIOR ART

The operation of gas engine using producer gas as fuel requires a carburettor in order to maintain the required air-fuel ratio over the range of operating conditions. The features needed to be envisaged in the gas carburettor are:

Ability to maintain required air-fuel ratio of 1.2:1 for producer gas carburettor as against 6 to 10:1 for natural gas/biogas on volume basis, with load or throttle variations.

Fast response to engine requirements with minimal pressure loss.

Shut-off of the fuel in the case of engine tripping or shut down.

Provision for air-fuel ratio tuning during testing.

One of the fundamental restrictions with producer gas operation for SI engine under all load change conditions is that the engine has to supply with nearly the set air-fuel ratio (can be stoichiometric) under all load and speed conditions. Further the transient response of the carburettor must be fast enough to account for the continuous load variations especially in case of engine supplying power to the utility where load variation is a very common feature.

Literature in the field of producer gas is scant. However, producer gas carburettors can be classified into following three categories:

Mechanically controlled,
Pneumatically controlled,
Electronically controlled.

Douglas G Janisch in his patented work (U.S. Pat. No. 5,070,851 Dec. 10, 1991) has designed a carburettor as which is adapted from gasoline operation. The device permits start up with gasoline and a smooth transition from gasoline fuel start up to full operation on producer gas. The carburettor has a pair of concentric, stepped venturi inlets wherein the producer gas is introduced into an expanding venturi simultaneously and concentrically with the introduction of air through a reducing venturi, accelerating and commingling the fuel and air to provide a suitable mixture for introduction into the throat of a typical carburettor. One unique feature of the device is the ability to adjust and restrict the air flow introduced into this system while maintaining the flow of the producer gas at maximum levels at all times. The carburettor has been found to be particularly useful in the application using a down draft gasifier. The natural draw produced by the suction of the engine manifold is enough for the mixing of the fuel air, eliminating any need for pressurization of the producer gas as it is fed into the engine. These devices are appropriate for small power applications and the area of cross section of the venture meter becomes an important zone for maintenance using producer gas. Further the start up fuel is gasoline and later to be switched to producer gas.

Methods Used for Air Fuel Ratio Control

There are several attempts to control the air fuel ratio using sensors and control systems for maintaining the stoichiometric conditions. The principle adapted is to use engine exhaust to adjust the airflow rate. Toyoaki et al of Mitsubishi Motors Corporation have presented a mathematical equation to arrive at the air-fuel ratio knowing the exhaust gas composition. The equation involved carbon monoxide, carbon dioxide, total hydrocarbon, oxygen and oxides of nitrogen. The usefulness of this equation has been amply proved for precise evaluation of air-fuel ratio control systems. Dermot et al have attempted to compare various air-fuel ratio calculation methods for the consistency in results. Attempts have been made to present exhaust gas analysis data from a four stroke spark ignition engine burning two different fuels—gasoline and liquefied petroleum gas. However it is significant to note that much work on the control system using air-fuel ratio sensors and automatic control systems has been done with a focus on maximizing the efficiency of three-way catalytic converter, which has a very narrow window of peak performance. Literally no work mentions use of control system for maintaining of stoichiometry for producer gas based SI engine to prevent stoichiometry related de-rating.

Tung-Ching et al have presented work on adaptive air-fuel ratio controllers for spark ignition engine throttle transients. An adaptive air-fuel ratio controller for a spark ignition engine throttle transient was developed. The scheme was based on event-based, single parameter fuel dynamics model. A least square error algorithm with an active forgetting factor was used for parameter identification. Testing of the control system with Ford Ztech engine under a set of throttle-transient operations have indicated quick learning on the part of the adaptor. On somewhat similar lines, Piero Azoni et al have developed an air-fuel ratio controller using the throttle angle information along with some other signals. The main objective has been to evaluate the possibility of achieving finer air-fuel ratio control especially during transient conditions that involve sudden variations in the physical conditions inside the intake manifold due to fast throttle opening or closing.

The primary aim here has been to achieve better performance for the air-fuel ratio regulation system, there by improving the engine efficiency and exhaust emissions during transient phases: Yoshishige Ohyama has presented work on air/fuel control using upstream model in the intake system. A generalized model of the air/fuel ratio control using estimated air mass in the cylinder were presented to obtain a highly accurate control during transient conditions in high supercharged direct injection systems with a complex air induction system. Berggren et al have developed an air fuel ratio controller using the throttle angle information along with some other signals. The main objective has been to evaluate the possibility of achieving finer air-fuel ratio control especially during transient conditions that involve sudden variations in the physical conditions inside the intake manifold due to fast throttle opening and closing.

SUMMARY OF THE PRESENT INVENTION

It is the primary object of the present invention to provide a producer gas carburettor, for use in a gas engine to maintain A/F at varying load condition.

The gas carburettor is expected to deliver nearly constant air-to-fuel mixture irrespective of the load, implying gas flow rate and corresponding air flow rate as demanded by the reciprocating engine. The principle on which the carburettor is designed based on area ratio control with balancing the pressure on the gas and air line. The newly invented producer gas carburettor comprises of (a) a separate entry for air and air passage (b) a separate entry for producer gas and gas passage (c) an adjustable centrally mounted flapper plate separating air and gas passages (d) a mechanism for flapper plate adjustment (e) a throat of minimum cross section and (f) a mixing zone.

The throat is the key element of the current carburettor design, wherein the mixture of air and gas achieve very high velocities, in the range of 30-80 m/s, depending on the load demand on the engine. This high velocity ensures minimal variation in the A/F ratio despite of pressure variations downstream of the gas carburettor. The desired A/F of 1.1:1.0 to 1.3:1.0 (mass basis) for engine operation depending upon the gas quality is achieved by (i) maintaining the area ratio for air and gas passage at the throat section (ii) ensuring nearly equal air and gas pressure upstream of the throat section. Equal air and gas pressure is achieved by using a zero pressure regulator fitted upstream of the fuel or gas line of the carburettor.

Downstream of the throat section air and gas would mix prior to the gas and air mixture entering the engine.

Therefore with the gas and air flow section area ratio (using a flapper plate) at central position, gas and air pressure being equal or nearly equal one can expect A/F of about in there range of 1.1:1.0 to 1.3:1.0 depending upon the flapper plate setting. Also, there is a mechanism provided for adjustment of the flapper plate position for rich and lean mixture for engine; adjustment of flapper towards gas side would result in reduction of gas and thereby higher A/F, whereas adjustment of flapper towards air side would be vice versa.

BRIEF DESCRIPTION OF THE DRAWINGS

The invention will now be described by way of example with reference to the accompanying drawings in which:

FIG. 2 illustrates Cross sectional view of the carburettor;

FIG. 3 illustrates Side view of the carburettor;

DETAILED DESCRIPTION OF THE INVENTION

Figure 1:
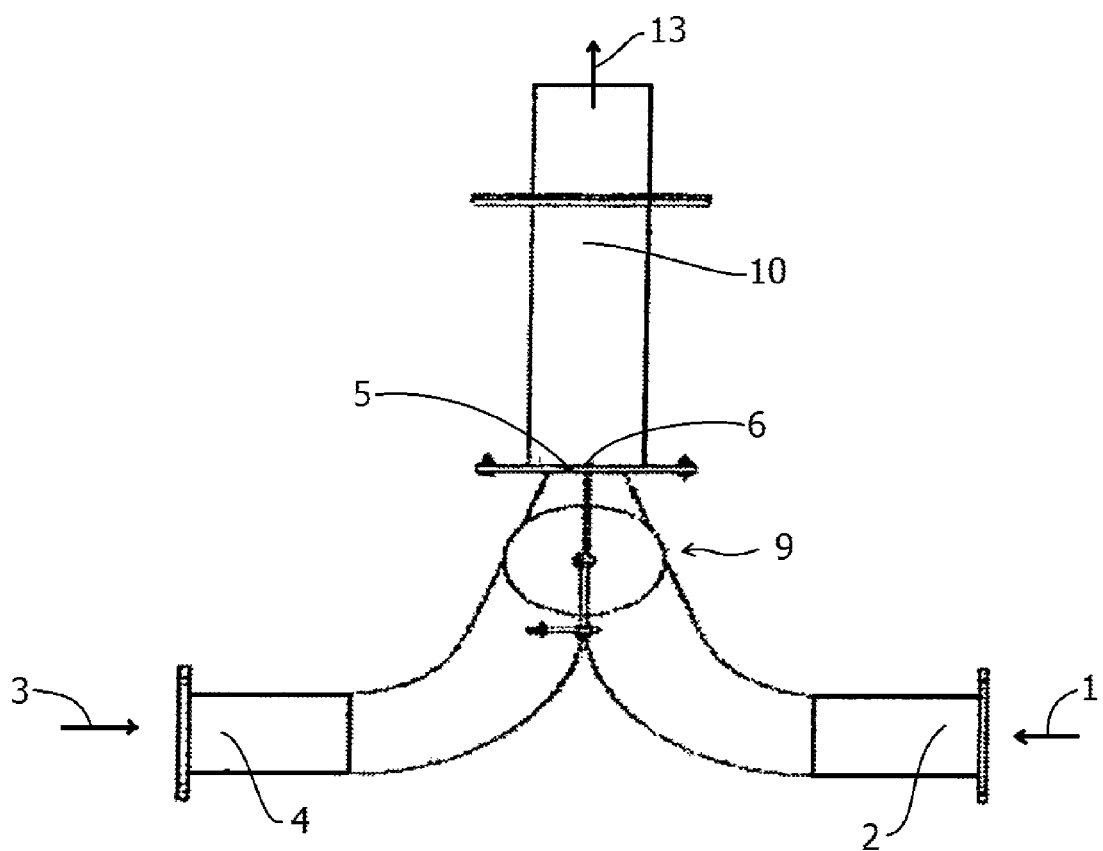
FIG. 1 illustrates the Producer gas carburettor.
Figure 4:
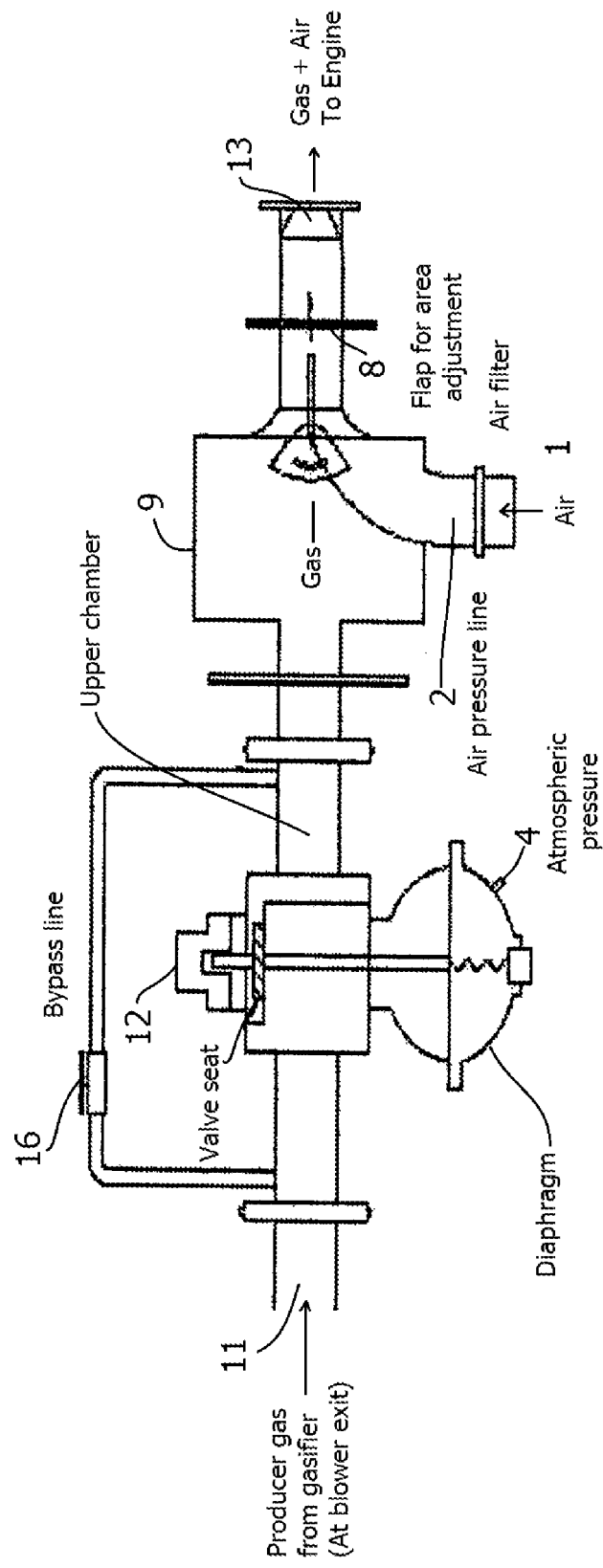
FIG. 4 illustrates the Sectional view of the of producer gas carburettor with zero pressure regulator in the air-gas line circuit.

FIGS. 1 and 2 illustrates both the outer and sectional view of a producer gas carburettor. FIGS. 3 and 4 are a side elevation and sectional view of the carburettor of FIG. 2. The carburettor 9 comprises of separate air entry 1 and air passage 2. Similarly a separate gas entry 3 and gas passage 4. The air passage 2 and gas passage 4 continue as separate passage till a part of the common section 5 beyond which the air and gas passages are still separated by a centrally located adjustable flapper plate 6. The flapper plate 6 begins at one end of the common section 5 and end at the throat section 7, which provides least cross sectional area for air and gas. The flapper plate 6 is designed to have least machining tolerance with the side plates 8 (see FIG. 3) of the common section 5. This design prevents air and gas interacting or mixing prior to the throat section. This arrangement provides control for A/F tuning by means of adjusting the central flapper plate 6 towards air or gas side. Beyond the throat section 7 is the mixing tube 10 wherein air and gas freely mix and forms a combustible air+gas mixture.

The carburettor is as shown in FIG. 4. The carburettor 9 is simple in design based on area ratio control. It has a separate port 1 and 3 for air and fuel respectively, where the individual ports could be modified or tuned to achieve required air-fuel ratio using the flap 6. The carburettor 9 is designed to operate in conjunction with the zero pressure regulators 12. The combination of zero pressure regulator 12 and gas carburettor 9 is located between gasifier (not shown) 11 and the engine intake system 13 as shown in FIG. 4. The zero pressure regulator 12 ensure a gas pressure 4 (downstream of regulator) identical to that of air pressure and this is achieved by connecting the air pressure line 2 (downstream of air filter) to the upper chamber of the regulator 12. This arrangement ensures the regulator to maintain the gas pressure close to that of air pressure (a few mm below atmospheric pressure) and thereby set the air-fuel ratio irrespective of the total mixture flow rate.

Figure 5:
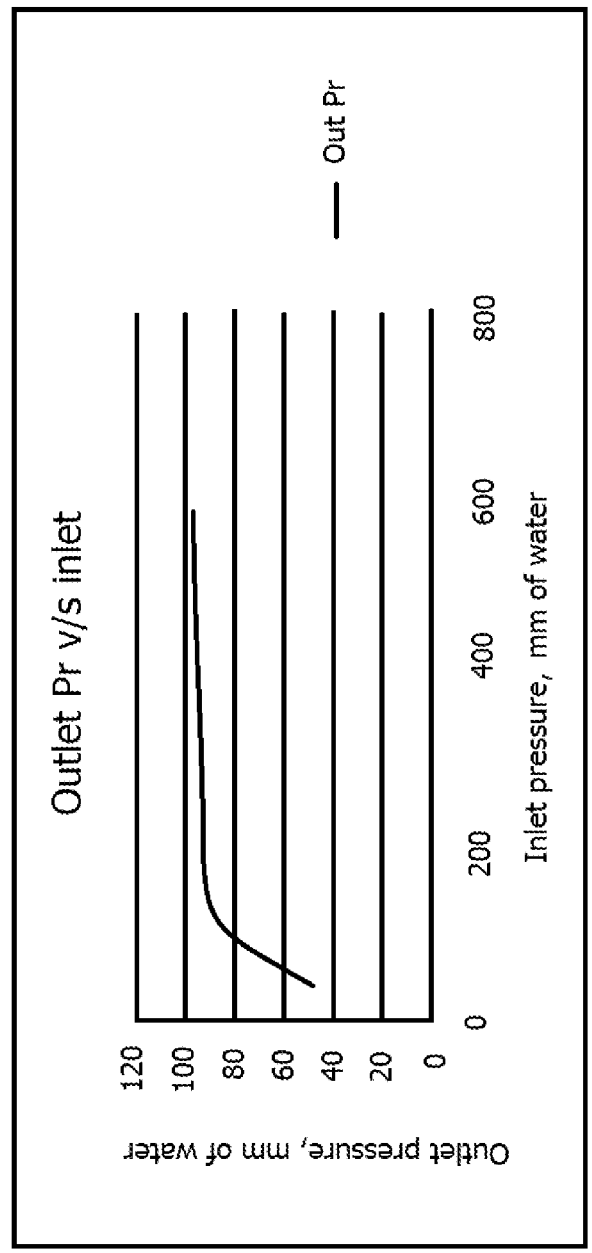
FIG. 5 illustrates a graph showing the variation of outlet pressure with inlet pressure for a zero pressure regulator.

FIG. 5 shows a graph (plot) of variation of outlet pressure of the zero pressure regulator with respect to inlet pressure. It is evident that beyond a pressure of 200 mm of water (2000 Pa), the outlet pressure is nearly constant for further increase in inlet pressure.

Figure 6:
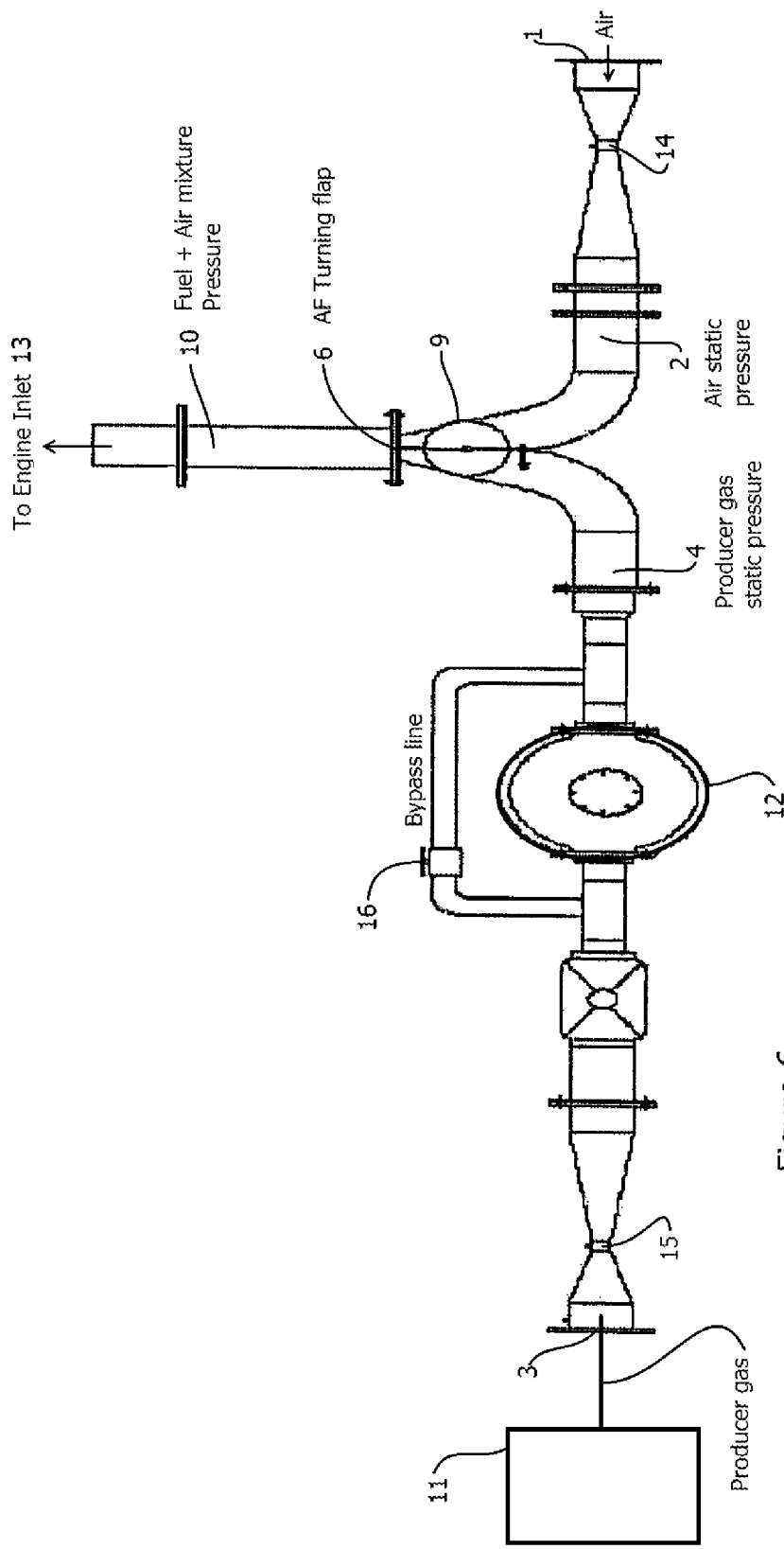
FIG. 6 illustrates a Schematic of the gas carburettor with all the measurement system

The general arrangement of the fuel gas circuitry elements is shown in FIG. 6. The gas circuit comprises of a zero pressure regulator 12 with a bypass arrangement 16 for start-up of the engine, producer gas carburettor as described earlier, safety device in the form of rupture disk. During the start up the bypass line 16 is open so that gas bypass the zero pressure regulator (12) and gas entering the engine. This ensures that the gas can be drawn during the initial cranking of the engine start up gas is available for engine to operate, during which sufficient suction is created to draw the gas through the regulator. After reaching idle speed, the by pass valve (16) is closed and the gas is then drawn through the zero pressure regulator. The entire operation has two version, mechanically operating the valve (open and close) or an electrically operated solonoid valve. The working of the gas circuitry system is as described below:

The producer gas is made available from IISc design biomass gasifier 11 at a pressure in excess of 2000 Pa at all times for satisfactory engine operation. The function of the zero pressure regulator 12 is to ensure that the gas pressure downstream of the pressure regulator is maintained same as the air pressure existing in the air passage 2 of the carburettor 9.

For the performance variation, various parameters, like pressures at different locations and gas and air flowrates. The air and gas flowrate are measured using calibrated venturimeters 14 and 15 respectively.

Maintenance of exit pressure nearly constant irrespective of the inlet pressure variation is important to ensure the area ratio control is effective.

Further in fine tuning the carburetion system, the carburettor shown in FIG. 1 is introduced with fine mechanical tuning system, which can control the position of the flapper either manually or through a motor. The signal for the motorised control is from oxygen control in the engine exhaust. Extremely fine movement of the flapper is needed on to the carburettor towards achieving maximum output, better emission controls and also during sudden load throw off conditions. In the normal operating condition, the flapper is in fixed position.

The advantage of the motorised system is the online adjustment of A/F ratio atter measuring exhaust oxygen measurement of the flue gas. Based on the requirement the mixture can be controlled for rich or lean operating condition or the set A/F ratio.

Further any variation in the gas composition during the operation due to gasifier operation requires, tuning of the flapper, which can be achieved by the fine tuning the flapper, manually or motorised.

Table 2 highlights the critical dimension of different ratings of Indian Institute of Science Producer Gas Carburettor system. The different models identified in the table are for different engine ratings. These dimensions are derived on the basis of maintaining about 30-80 m/s velocity at the throat, and other dimensions to ensure pressure recovery after mixing and the flapper to control the area of cross section of gas and air.

TABLE: 2

Design parameters for various producer gas carburettors (IISc-PGC-n) where n is the kW power

| Model IISc-PGC-n | Power Level of engine with Carburetor kWe | Diameter at gas entry (D1 mm) | Diameter at air entry (D2 mm) | Diameter at engine entry (D3 mm) | Throat length (L1) mm | Throat width (L2) mm | Throat area (A) mm$^2$ |
|---|---|---|---|---|---|---|---|
| 25 | 25 | 58 | 58 | 58 | 38 | 20 | 760 |
| 80 | 80 | 90 | 90 | 90 | 53 | 40 | 2120 |
| 120 | 120 | 90 | 90 | 90 | 63 | 45 | 2835 |
| 170 | 170 | 150 | 150 | 150 | 83 | 50 | 4150 |
| 240 | 240 | 150 | 150 | 150 | 88 | 60 | 5280 |

EXAMPLES

To illustrate the invention, different sets of experiments were carried out using the producer gas carburettor with the engine.

Example 1

The parameters to be noted down during the performance evaluation are given below:
Gas and mixture composition
Gas and air mass flow rate
Exhaust composition
Pressure of air and gas at inlets and mixture pressure at the outlet of the carburettor.

Gas/Mixer Composition Measurement

The producer gas composition was measured continuously using an online gas analyzer at each load. The Maihak online gas analyzer can measure the composition of carbon monoxide (CO), carbon dioxide ($CO_2$), methane ($CH_4$), oxygen ($O_2$) and hydrogen ($H_2$). Gas and air flow rates were measured using calibrated venturimeters. The measurements were made on the IISc-PGC-25 model for a naturally aspirated engine. The carburettor is designed to deliver 25 kW when connected to the rated engine capacity.

TABLE 3

Measurements on gas air and mixture composition

| Gas flow rate g/s | Air flow rate g/s | Ratio A/F | Oxygen in the mixture % |
|---|---|---|---|
| 12.7 | 19.1 | 1.5 | 13 |
| 11.9 | 18.0 | 1.5 | 14 |

TABLE 3-continued

Measurements on gas air and mixture composition

| Gas flow rate g/s | Air flow rate g/s | Ratio A/F | Oxygen in the mixture % |
|---|---|---|---|
| 21.7 | 28.3 | 1.3 | 11 |
| 21.5 | 27.0 | 1.3 | 11 |
| 21.0 | 26.7 | 1.3 | 11 |
| 25.7 | 34.0 | 1.3 | 12 |
| 26.6 | 36.7 | 1.4 | 11 |
| 27.5 | 37.1 | 1.4 | 11 |

Table provides the details of the measurements carried out on the carburettor. Gas and air flow rates are measured for varying conditions. The mixture at the carburettor exit was analysed for oxygen percentage. The stoichiometric requirement of A/F for the producer gas is in the range of 1.1-1.35 depending upon the gas composition, amount to about 10% oxygen in the mixture. The measured composition in the mixture is in the range of 11 to 14%, which is well within the operating range for the producer gas combustion limas. This is consistent with the measured A/F based on the air and gas flow rates.

Example 2

The IISc-PGC-120, rated for about 120 kW power generation using a turbo charger with a suitable gasification and engine system was tested. Gas pressure was held in excess of 2000 Pa during the engine operation at the entry into the zero pressure regulator as indicated in FIG. 1. Table provides the details of air and gas flow rate at various operating conditions, nearly no load to full load conditions. Based on the gas and air flow measurements, the A/F values are also presented in the table.

TABLE 4

Performance of the IISc-PGC-120 along with the engine

| Load (kW) | Gas Flow (Kg/s) | Air flow (Kg/s) | A/F | $O_2$ in the mixture % |
|---|---|---|---|---|
| 0 | 0.029 | 0.04 | 1.42 | 13.88 |
| 20 | 0.041 | 0.04 | 1.01 | 13.23 |
| 30 | 0.041 | 0.05 | 1.30 | 13.09 |
| 45 | 0.046 | 0.06 | 1.38 | 13.17 |
| 50 | 0.046 | 0.06 | 1.38 | 13.18 |
| 60 | 0.050 | 0.07 | 1.34 | 11.94 |
| 70 | 0.055 | 0.07 | 1.24 | 11.09 |
| 80 | 0.058 | 0.07 | 1.23 | 11.18 |
| 90 | 0.058 | 0.08 | 1.30 | 12.69 |
| 100 | 0.062 | 0.08 | 1.29 | 12.65 |
| 110 | 0.065 | 0.08 | 1.27 | 13.88 |

Over the wide range of operating conditions, the A/F has been maintained in required range of 1:1 to 1:4. The oxygen in the gas air mixture is found to be in the range of 11 to 14% which is well within the ignition limits of producer gas.

Example 3

The IISc-PGC-240, rated for about 240 kW power generation using suitable gasification and engine system was tested. The engine was with a turbo charger. Gas pressure was held in excess of 2000 Pa during the engine operation at the entry into the zero pressure regulator as indicated in FIG. 1. Table provides the details of air and gas flow rate at various operating conditions, nearly no load to full load conditions. Based on the gas and air flow measurements, the A/F values are also presented in the table.

TABLE 5

Performance of the IISc-PGC-240 along with the engine

| Load (kW) | Gas Flow (Kg/s) | Air Flow (Kg/s) | A/F | $O_2$ in the mixture % |
|---|---|---|---|---|
| 40 | 0.08 | 0.12 | 1.50 | 13.89 |
| 70 | 0.11 | 0.12 | 1.10 | 12.7 |
| 85 | 0.11 | 0.12 | 1.11 | 12.85 |
| 100 | 0.11 | 0.14 | 1.27 | 12.82 |
| 110 | 0.13 | 0.15 | 1.10 | 13.0 |
| 125 | 0.13 | 0.15 | 1.13 | 13.65 |
| 140 | 0.16 | 0.16 | 1.01 | 13.01 |
| 150 | 0.16 | 0.17 | 1.11 | 13.19 |
| 170 | 0.17 | 0.19 | 1.10 | 13.40 |
| 180 | 0.17 | 0.19 | 1.11 | 13.59 |
| 190 | 0.17 | 0.20 | 1.17 | 13.62 |
| 200 | 0.19 | 0.21 | 1.17 | 13.65 |
| 210 | 0.19 | 0.21 | 1.17 | 14.49 |
| 220 | 0.22 | 0.24 | 1.15 | 14.1 |
| 230 | 0.22 | 0.24 | 1.16 | 14.19 |
| 240 | 0.23 | 0.24 | 1.15 | 13.13 |

Over the wide range of operating conditions, the A/F has been maintained in required range of 1:1 to 1:4. The oxygen in the gas air mixture is found to be in the range of 11 to 14% which is well within the ignition limits of producer gas. The oxygen percentage in the engine exhaust has been found to be in the range of 1.2 to 3%.

REFERENCE

1. Toyoaki Fukui Yasuki Tamura, Shogo Omori and Shinichiroh Saitoh, "Accuracy of A/F Calculation from Exhaust Gas Composition of SI Engines", Mitsubishi Motors Corp., SAE Paper 891971.
2. Tung-Ching Tseng and Wai K. Cheng, "An Adaptive Air/Fuel Ratio Controller for SI Engine Throttle Transients" Massachusetts Institute of Technology, 1999-01-0552
3. Piero Azzoni, Giorgio Minelli and Davide Moro "Air-Fuel Ratio Control for a high performance engine using Throttle angle information" SAE paper 1999-01 1169
4. Yoshishige Ohyama, "Air/fuel ratio control using upstream models in the intake system." SAE paper 0857 vol1 1999.
5. Berggren P and Perkovic A, "*Cylinder Individual Lambda Feedback Control in an SI Engine*", Technical Presentation at Lnkoping, Reg: LiTH-ISY-EX-1649, 1996

The invention claimed is:

1. A gas carburettor (9) comprising:
   (a) an air inlet (1) leading to an air passage (2) and a gas inlet (3) leading to a gas passage (4);
   (b) a common section (5) downstream of the air passage and the gas passage, the common section having a throat (7) leading from the air passage and the gas passage to a mixing zone (10);
   (c) an adjustable flapper (6) located at least partially in the throat, the flapper separating the air passage from the gas passage;
   (d) means for supplying air to the common section (5);
   (e) means for supplying gas to the common section (5); and
   (f) a zero pressure regulator (12) for providing the air and the gas at a regulated pressure;
   (g) a bypass line (16) upstream of the zero pressure regulator (12) for gas flow during start up; and
   (h) a valve provided on the bypass line (16) for opening and closing during start up.

2. The gas carburettor as claimed in claim 1, wherein the air and the gas is mixed to an air to gas ratio (A/F ratio) of between 1.1 and 1.4.

3. The gas carburettor as claimed in claim 2, wherein the flapper (6) comprises a means for adjusting the area for gas and air passage through the throat resulting in the change of the A/F ratio for gaseous fuel depending upon the gaseous fuel.

4. The gas carburettor as claimed in claim 2, further comprising means for micro control of the A/F ratio during operation for optimal performance, such as a motorized control based on the oxygen level in the engine exhaust (lambda).

5. The gas carburettor as claimed in claim 4, wherein the throat has dimensions so as to maintain throat velocities of gas and air passage through the throat in the range of 30-80 m/s to attain right engine operating conditions.

6. The gas carburettor as claimed in claim 1, further comprising means for providing the air and the gas to both naturally aspirated engines and turbo charged engines.

7. The gas carburettor as claimed in claim 1, wherein the bypass line comprises solenoid valves for opening and closing during start up.

8. The gas carburettor as claimed in claim 1, wherein the gas is supplied at a pressure of 2000 Pa to 5000 Pa.

9. The gas carburettor as claimed in claim 1, wherein the flapper (6) comprises a means for adjusting the area for gas and air passage through the throat resulting in the change of the A/F ratio for gaseous fuel depending upon the gaseous fuel.

10. The gas carburettor as claimed in claim 1, further comprising means for micro control of the A/F ratio during operation for optimal performance.

11. The gas carburettor as claimed in claim 10, wherein the means for micro control of the A/F ratio during operation for optimal performance is a motorized control based on the oxygen level in the engine exhaust (lambda).

12. The gas carburettor as claimed in claim 1, wherein the gas is a low calorific gas selected from the group consisting of producer gas and biogas.

13. The gas carburettor as claimed in claim 1, wherein the A/F ratio for the gas for the entire range of flow from no load to full load has a turn down ratio of 1:5 over the entire operating range of the engine.

14. A method for gas carburetion of low calorific value gas to attain a fixed air to gas ratio (A/F ratio) at varying engine loads of a gas carburettor, comprising:
(a) supplying gas and air via separate gas and air inlets, respectively, to a mixing section (5);
(b) controlling an area of the gas and air inlets and passages using a flapper located near a throat, and maintaining velocities of the gas and air through the throat at between 30-80 m/s;
(c) adjusting the A/F ratio depending upon the fuel;
(d) regulating the pressure of the gas and the air; and
(e) micro-controlling the A/F ratio using oxygen level in exhaust from an engine using the method,
wherein the gas carburettor (9) comprises:
(a) an air inlet (1) leading to an air passage (2) and a gas inlet (3) leading to a gas passage (4);
(b) a common section (5) downstream of the air passage and the gas passage, the common section having a throat (7) leading from the air passage and the gas passage to a mixing zone (10);
(c) an adjustable flapper (6) located at least partially in the throat, the flapper separating the air passage from the gas passage;
(d) means for supplying air to the common section (5);
(e) means for supplying gas to the common section (5); and
(f) a zero pressure regulator (12) for providing the air and the gas at a regulated pressure;
(g) a bypass line (16) upstream of the zero pressure regulator (12) for gas flow during start up; and
(h) a valve provided on the bypass line (16) for opening and closing during start up.

15. The method as claimed in claim 14, further comprising maintaining the A/F ratio at between 1.1 and 1.4.

16. The method as claimed in claim 14, wherein the A/F ratio for the gas for the entire range of flow from no load to full load has a turn down ratio of 1:5 over the entire operating range of the engine.

17. The method as claimed in claim 14, wherein the gas is a low calorific gas selected from the group consisting of producer gas and biogas.

* * * * *